US009931812B2

(12) United States Patent
Kashiwagi et al.

(10) Patent No.: US 9,931,812 B2
(45) Date of Patent: Apr. 3, 2018

(54) INSULATING PAPER FOR OIL-IMMERSED MOTORS

(71) Applicant: NITTO SHINKO CORPORATION, Sakai-shi, Fukui (JP)

(72) Inventors: Yasuo Kashiwagi, Sakai (JP); Yoshiki Takahashi, Sakai (JP); Yoshihide Kitagawa, Sakai (JP); Jun Fujiki, Sakai (JP)

(73) Assignee: NITTO SHINKO CORPORATION, Sakai-shi (JP)

( * ) Notice: Subject to any disclaimer, the term of this patent is extended or adjusted under 35 U.S.C. 154(b) by 0 days.

(21) Appl. No.: 14/430,965

(22) PCT Filed: Dec. 27, 2012

(86) PCT No.: PCT/JP2012/084319
§ 371 (c)(1),
(2) Date: Mar. 25, 2015

(87) PCT Pub. No.: WO2014/103084
PCT Pub. Date: Jul. 3, 2014

(65) Prior Publication Data

US 2015/0352811 A1 Dec. 10, 2015

(51) Int. Cl.
*B32B 7/12* (2006.01)
*B32B 27/34* (2006.01)
(Continued)

(52) U.S. Cl.
CPC ................ *B32B 7/12* (2013.01); *B32B 27/08* (2013.01); *B32B 27/34* (2013.01); *B32B 27/36* (2013.01);
(Continued)

(58) Field of Classification Search
CPC .............. Y10T 428/24504; H02K 3/30; B32B 2250/02; B32B 2250/24; B32B 2266/00;
(Continued)

(56) References Cited

U.S. PATENT DOCUMENTS 5,277,972 A 1/1994 Sakumoto et al.
5,683,806 A 11/1997 Sakumoto et al.
(Continued)

FOREIGN PATENT DOCUMENTS

CN 101258028 A 9/2008
CN 101258214 A 9/2008
(Continued)

OTHER PUBLICATIONS

International Search Report dated Oct. 30, 2013 issued in corresponding application No. PCT/JP2012/084319.
(Continued)

*Primary Examiner* — Samir Shah
*Assistant Examiner* — Alicia J Sawdon
(74) *Attorney, Agent, or Firm* — Westerman, Hattori, Daniels & Adrian, LLP

(57) ABSTRACT

There is provided insulating paper for oil-immersed motors used in an oil-immersed motor in a state where folding is applied to the paper, the motor operating in a state where it is immersed in a cooling oil, the paper including a polyester film and heat resistant sheets made from aromatic polyamide laminated to both front and back surfaces of the polyester film, the polyester film and the heat resistant sheets being bonded with an acrylic adhesive, wherein the acrylic adhesive contains polyisocyanate and a polybutyl acrylate having a weight average molecular weight of 400,000 or more in a proportion of the polyisocyanate of more than 3 parts by weight and 20 parts by weight or less based on 100 parts by weight of the polybutyl acrylate.

17 Claims, 11 Drawing Sheets

4
3
2
3
4
1

(51) Int. Cl.

*B32B 27/36* (2006.01)
*B32B 27/08* (2006.01)
*H02K 3/30* (2006.01)

(52) U.S. Cl.

CPC ....... *B32B 2250/03* (2013.01); *B32B 2250/24* (2013.01); *B32B 2250/40* (2013.01); *B32B 2255/10* (2013.01); *B32B 2255/26* (2013.01); *B32B 2307/304* (2013.01); *B32B 2307/306* (2013.01); *B32B 2307/50* (2013.01); *B32B 2307/70* (2013.01); *B32B 2605/08* (2013.01); *H02K 3/30* (2013.01); *Y10T 428/2495* (2015.01); *Y10T 428/31562* (2015.04)

(58) Field of Classification Search

CPC ........ B32B 2266/02; B32B 2266/0228; B32B 2266/025; B32B 2307/536; B32B 2307/56; B32B 2307/72; B32B 2307/734; B32B 2419/00; B32B 2439/00; B32B 2439/62

See application file for complete search history.

(56) References Cited

U.S. PATENT DOCUMENTS

| | | | | |
|---|---|---|---|---|
| 5,824,182 | A | 10/1998 | Sakumoto et al. | |
| 5,891,566 | A | 4/1999 | Sakumoto et al. | |
| 2003/0098630 | A1 | 5/2003 | Owada et al. | |
| 2007/0055006 | A1* | 3/2007 | Kim | C09J 133/08 524/556 |
| 2008/0262152 | A1* | 10/2008 | Koehler | C08F 218/04 524/599 |
| 2009/0279030 | A1 | 11/2009 | Toyama et al. | |

FOREIGN PATENT DOCUMENTS

| | | | | |
|---|---|---|---|---|
| CN | 102333838 | A | | 1/2012 |
| CN | 102649898 | A | | 8/2012 |
| JP | 2-133483 | A | | 5/1990 |
| JP | 7-75274 | A | | 3/1995 |
| JP | 10-251614 | A | | 9/1998 |
| JP | 10-304614 | A | | 11/1998 |
| JP | 11-116644 | A | | 4/1999 |
| JP | 2001-112210 | A | | 4/2001 |
| JP | 2003-164088 | A | | 6/2003 |
| JP | 2006-262687 | A | | 9/2006 |
| JP | 2006262687 | A | * | 9/2006 |
| JP | 2008-178197 | A | | 7/2008 |
| JP | 2012-170248 | A | | 9/2012 |

OTHER PUBLICATIONS

Notification Concerning Transmittal of International Preliminary Report on Patentability (Form PCT/IB/326) issued in counterpart International Application No. PCT/JP2012/084319 dated Jul. 9, 2015, with Forms PCT/IB/373 and PCT/ISA/237 ( 6 pages).

Office Action dated Mar. 4, 2016, issued in counterpart Chinese Patent Application No. 201280077345.6 (6 pages).

Office Action dated Jan. 13, 2017, issued in counterpart Chinese Application No. 201280077345.6. (7 pages).

* cited by examiner

INSULATING PAPER FOR OIL-IMMERSED MOTORS

TECHNICAL FIELD

The present invention relates to insulating paper for oil-immersed motors used as an insulating material in oil-immersed motors.

BACKGROUND ART

A motor generator which functions selectively as an electric motor and a generator is mounted in hybrid cars or electric vehicles. Such a motor generator comprises, for example, a cylindrical rotor fixed to an output shaft supported rotatably about the shaft center, a motor stator having an inner circumferential surface which is disposed with a predetermined gap to the outer circumferential surface of the rotor, and a motor housing for accommodating the motor stator.

Since the motor generator generates heat by the operation such as acceleration and deceleration of a motor vehicle to be heated to a high temperature of 100° C. or more, it is required to be sufficiently cooled in order to maintain a predetermined performance.

As a method for effectively cooling the motor generator, there has been known a method of supplying a cooling oil into the housing, immersing the motor stator and rotor in the cooling oil, and circulating the cooling oil. (Patent Document 1)

CITATION LIST

Patent Document

[Patent Document 1]

Japanese Patent Application No. Hei-11-288030 (Publication of Japanese Patent Application No. 2001-112210)

Incidentally, the motor stator which constitutes the motor generator generally includes a core material and a winding, and insulating paper is used for insulating the core material from the winding or the winding from a winding having a different phase; and in the motor stator heated to a high temperature by the generation of heat, heat resistance is required also for the insulating paper.

Further, in this type of motor generator which is immersed in a cooling oil for cooling as described above (in the present invention, it is also referred to as an oil-immersed motor), the insulating paper is also required to be excellent in oil resistance.

Conventionally, a laminate in which heat-resistant paper layers are laminated to both sides of a polyester film for ensuring a predetermined strength and breakdown voltage via a urethane adhesive has been investigated as the insulating paper excellent in heat resistance and oil resistance.

The insulating paper of such a structure has high heat resistance by laminating the heat-resistant paper to both sides of the polyester film and uses a urethane adhesive excellent in heat resistance. Therefore, even when the cooling oil heated to a high temperature has permeated the inner part of the insulating paper, the insulating paper is considered to be able to endure the temperature.

SUMMARY OF INVENTION

Technical Problem

Incidentally, the insulating paper for oil-immersed motors of this type is frequently used in a folded state and is required to prevent the protrusion of an adhesive even when it is strongly folded, but it is not in a state where such request is sufficiently satisfied.

Therefore, the object of the present invention is to provide insulating paper in which an adhesive is hard to protrude.

Solution to Problem

According to the present invention, there is provided insulating paper for oil-immersed motors used in an oil-immersed motor in a state where folding is applied to the paper, the motor operating in a state where it is immersed in a cooling oil, the paper comprising a polyester film and heat resistant sheets made from aromatic polyamide laminated to both front and back surfaces of the polyester film, the polyester film and the heat resistant sheets being bonded with an acrylic adhesive, wherein the acrylic adhesive contains polyisocyanate and a polybutyl acrylate having a weight average molecular weight of 400,000 or more in a proportion of the polyisocyanate of more than 3 parts by weight and 20 parts by weight or less based on 100 parts by weight of the polybutyl acrylate.

Advantageous Effect of Invention

The present invention provides insulating paper for oil-immersed motors in which an adhesive is hard to protrude.

DESCRIPTION OF EMBODIMENTS

Hereinafter, the embodiments of the present invention will be described in detail.

Figure 1:
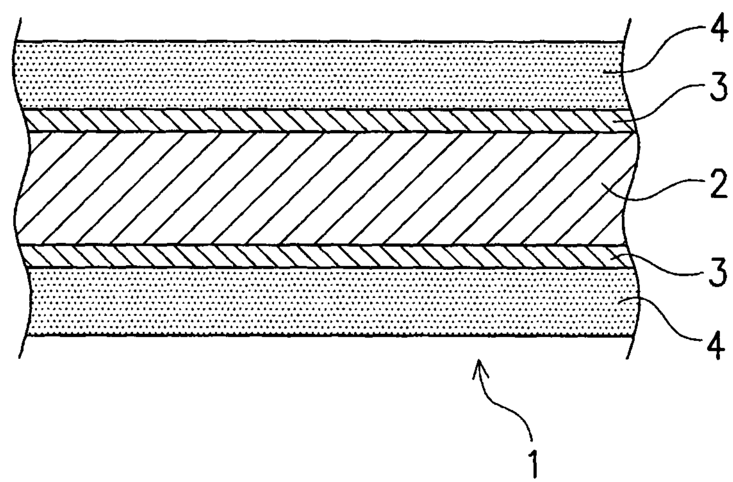
FIG. 1 is a sectional view showing an embodiment of the insulating paper for oil-immersed motors of the present invention.
Figure 2:
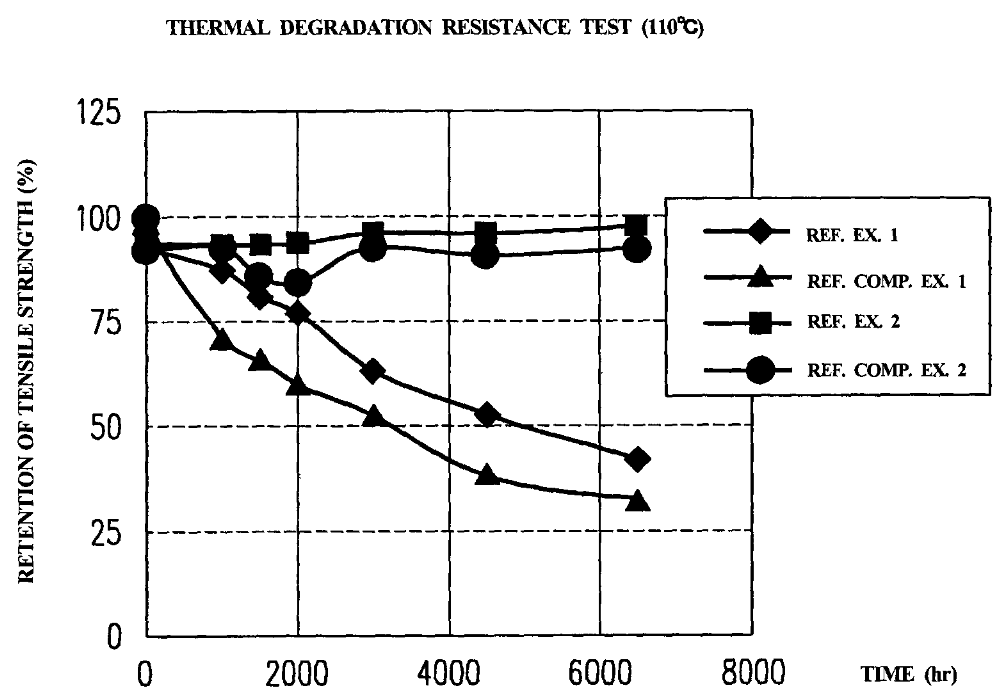
FIG. 2 is a graph showing the change with time of the retention of tensile strength at 110° C.
Figure 3:
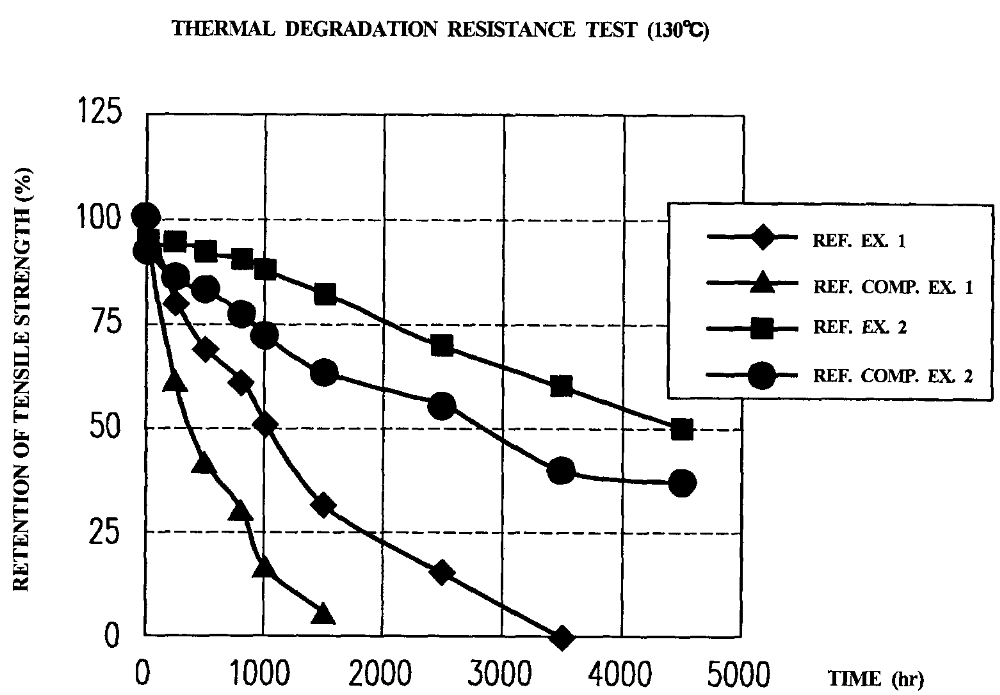
FIG. 3 is a graph showing the change with time of the retention of tensile strength at 130° C.
Figure 4:
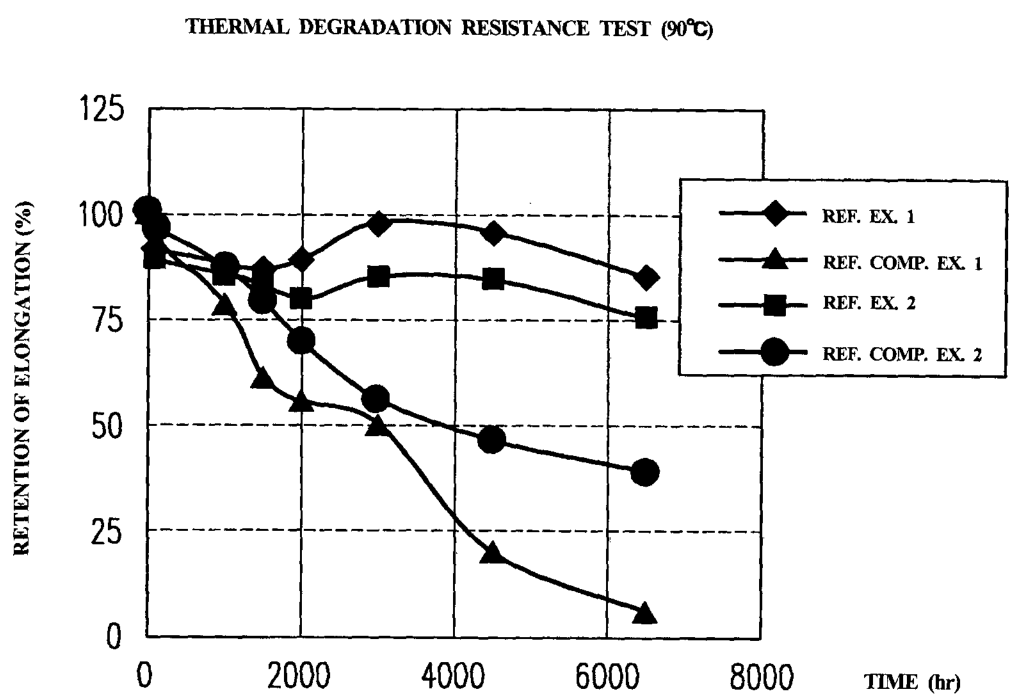
FIG. 4 is a graph showing the change with time of the retention of elongation at 90° C.
Figure 5:
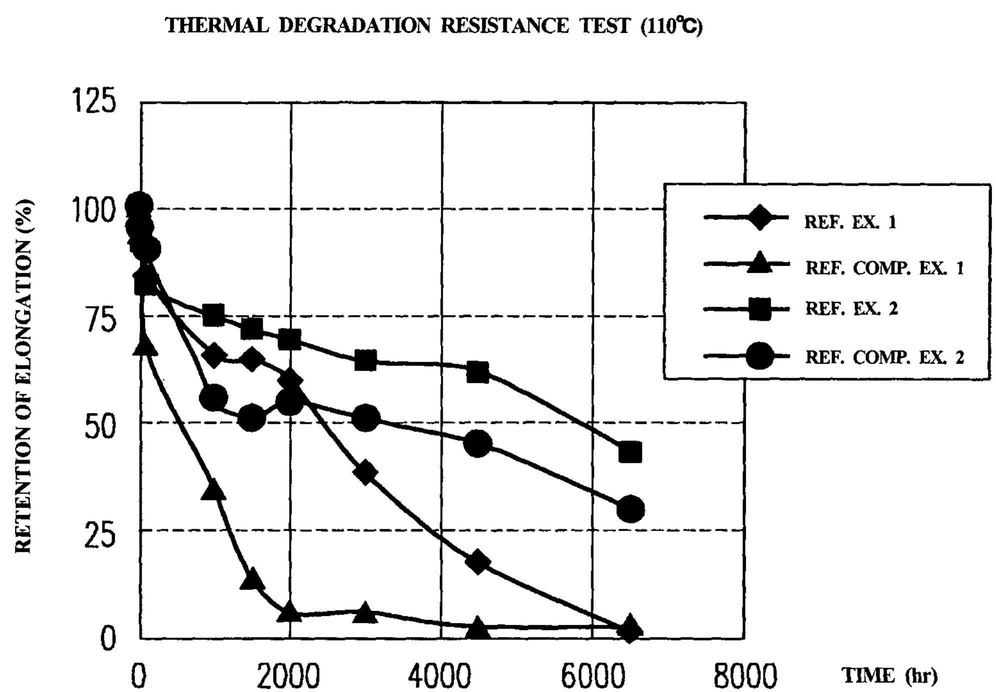
FIG. 5 is a graph showing the change with time of the retention of elongation at 110° C.
Figure 6:
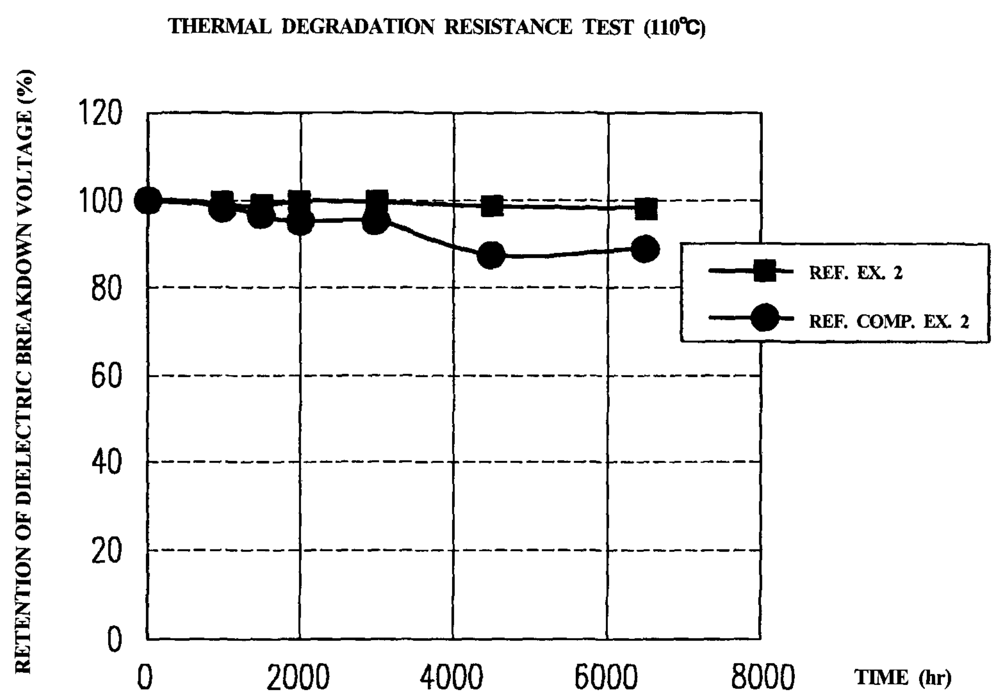
FIG. 6 is a graph showing the change with time of the retention of dielectric breakdown voltage at 110° C.
Figure 7:
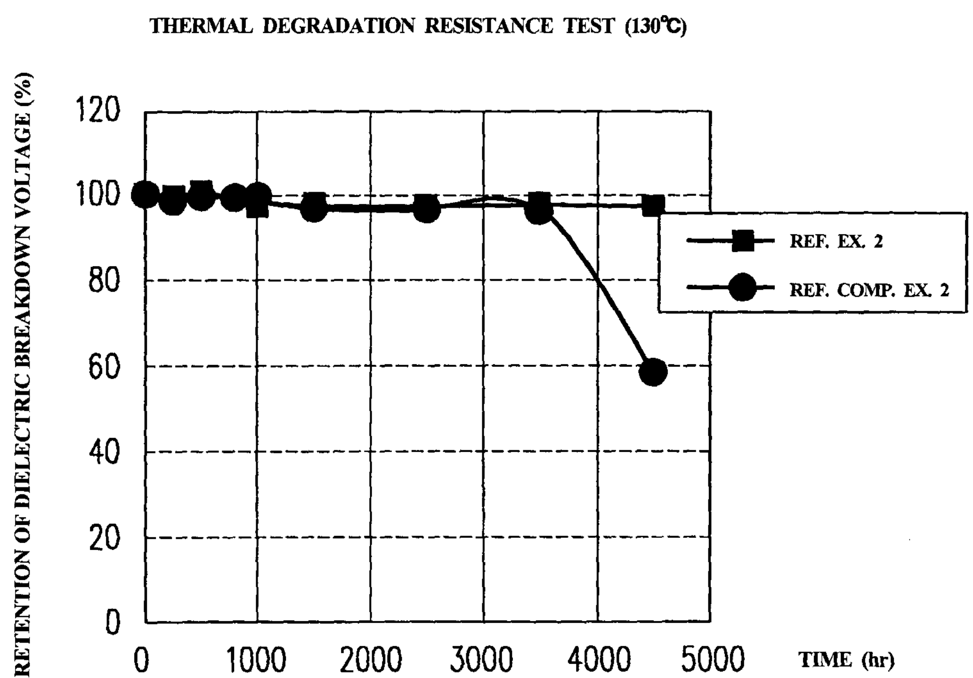
FIG. 7 is a graph showing the change with time of the retention of dielectric breakdown voltage at 130° C.
Figure 8:
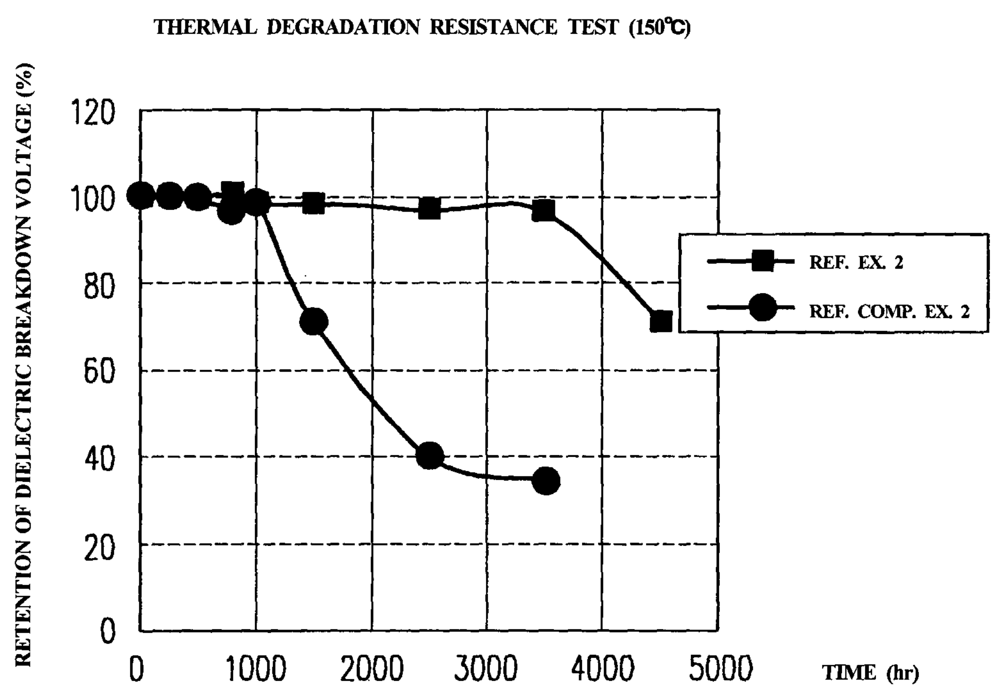
FIG. 8 is a graph showing the change with time of the retention of dielectric breakdown voltage at 150° C.

FIG. 1 is a sectional view showing an embodiment of the insulating paper for oil-immersed motors of the present invention. As shown in FIG. 1, the insulating paper 1 for oil-immersed motors of the present embodiment includes a polyester film 2 and heat resistant sheets 4, 4 disposed on both front and back surfaces of the polyester film 2, which are bonded via an acrylic adhesive 3.

With respect to a resin which forms the polyester film 2, a resin film having a strength and breakdown voltage required as insulating paper can be widely used. Specifically, a resin film having a strength of 150 MPa or more and a breakdown voltage of 3 kV or more can be suitably used.

Examples of the polyester film 2 include polyethylene naphthalate (PEN) and polyethylene terephthalate (PET).

Especially, it is preferred to use a low-oligomer type PET or PEN, and the use of such a low-oligomer type resin is effective in that the hydrolysis resistance can be further improved to prevent degradation.

The thickness of the polyester film 2 is not particularly limited, but a film having a thickness of 16 to 350 μm can be suitably used.

With respect to a resin which forms the heat resistant sheet 4, a film made from a resin having better heat resistance than the polyester film can be suitably used.

Examples of the heat resistant sheet include a paper-like product or a film-like product made from polyimide (PI), polyamide, polyphenylene sulfide (PPS), polyether ether ketone (PEEK), a tetrafluoroethylene copolymer (ETFE) or the like.

Further, when the heat resistant sheet is a sheet made from polyamide, the sheet will have good slipping properties, and as a result, such an effect can be obtained that the sheet is easily inserted between a core material and a winding of a motor stator in the oil-immersed motor, that is, between the slots provided in the core material.

As the polyamide, aromatic polyamide (for example, Nomex, manufactured by Du Pont) can be suitably used.

The thickness of the heat resistant sheet 4 is not particularly limited, but a sheet having a thickness of 16 to 125 μm can be suitably used.

The acrylic adhesive 3 contains polyisocyanate and polybutyl acrylate in a proportion of the polyisocyanate of more than 3 parts by weight and 20 parts by weight or less, and preferably in a proportion of 10 parts by weight or more and 20 parts by weight or less, based on 100 parts by weight of the polybutyl acrylate.

As the polybutyl acrylate, a polybutyl acrylate having a weight average molecular weight of 400,000 or more is used. The polybutyl acrylate preferably has a weight average molecular weight of 1,000,000 or less; thereby, the adhesive is hard to protrude from the insulating paper. Further, the polybutyl acrylate preferably has an Mw/Mn of 5 to 10, wherein Mw represents the weight average molecular weight, and Mn represents the number average molecular weight of the polybutyl acrylate; thereby, the adhesive is hard to protrude from the insulating paper.

Note that the weight average molecular weight and the number average molecular weight mean the values which are measured by gel permeation chromatography (GPC) and expressed in terms of polystyrene.

For example, the weight average molecular weight and the number average molecular weight can be defined as the values in terms of polystyrene based on the calculation from the results of GPC measurement at a column temperature of 40° C. and a flow rate of 0.5 ml/min using a GPC "HLC-8320GPC" manufactured by Tohsoh Corp. as an apparatus, wherein three columns in total are used in which a column "TSK guard column $H_{HR}$ (S)" manufactured by Tohsoh Corp., a column "TSK $GMH_{HR}$-H (S)" manufactured by Tohsoh Corp., and a column "TSK $GMH_{HR}$-H (S)" manufactured by Tohsoh Corp. are connected in series; "TSK gel SuperH-RC" is used as a reference column; and tetrahydrofuran is used as an eluent.

Further, an adhesive prepared by crosslinking polybutyl acrylate (PAB) with polyisocyanate can be suitably used as the acrylic adhesive.

Furthermore, an adhesive prepared by crosslinking a mixture in which terpene phenol is added to the polybutyl acrylate (PAB) with polyisocyanate is preferably used as the acrylic adhesive; thereby, the adhesion to the heat-resistant paper made from polyamide is further improved in a state where it is immersed in a high-temperature water-containing oil of 120 to 180° C. in the oil-immersed motor. The amount of terpene phenol added is preferably 1 to 30 parts by weight based on 100 parts by weight of polybutyl acrylate (PAB).

Also when alkylphenol is used instead of the terpene phenol, the adhesion to the heat-resistant paper made from polyamide is further improved in a state where it is immersed in a high-temperature water-containing oil of 120 to 180° C. in the oil-immersed motor. The amount of alkylphenol added is also preferably 1 to 30 parts by weight based on 100 parts by weight of polybutyl acrylate (PAB).

Thus, in order to bring polybutyl acrylate, or polybutyl acrylate to which an adhesion-improving agent such as alkylphenol and terpene phenol is added, in the acrylic adhesive into a state where it is crosslinked with polyisocyanate, for example, the adhesive may be heated during the bonding of the heat resistant sheets to the polyester film, using a polyisocyanate which has a low reactivity to polybutyl acrylate in normal temperature and a higher reactivity when it is heated, and using an acrylic adhesive containing such a polyisocyanate and polybutyl acrylate (and terpene phenol or alkylphenol).

Thereby, the crosslinking of polybutyl acrylate with polyisocyanate is suppressed until the acrylic adhesive is applied, for example, to either of the polyester film or the heat resistant sheets in normal temperature to laminate the heat resistant sheets to the polyester film to bring about a state where the acrylic adhesive is inserted between the polyester film and the heat resistant sheets; and then, the laminate can be subjected to pressurization and/or heating to bring the acrylic adhesive into a state where polybutyl acrylate is crosslinked with polyisocyanate to strongly bond the heat resistant sheets to the polyester film.

The terpene phenol and the alkylphenol also have the effect of softening the acrylic adhesive to impart a flexible texture to the insulating paper for oil-immersed motors and the effect of improving the heat resistance and hydrolysis resistance of the acrylic adhesive. Therefore, the terpene phenol or the alkylphenol can improve the durability of the insulating paper for oil-immersed motors and can also improve the processability during the folding, and when the heat-resistant paper made from polyamide is used as described above, the terpene phenol or the alkylphenol is preferably added in an amount of 10 parts by weight or more, for example, 20 parts by weight based on 100 parts by weight of butyl acrylate (PAB).

The acrylic adhesive may also contain a homopolymer, other than polybutyl acrylate, of a monomer represented by the following general formula (1):

$$CH_2{=}C(R^1){-}COOR^2 \quad (1)$$

(wherein $R^1$ represents a hydrogen atom or a lower alkyl group, and $R^2$ represents an alkyl group having 1 to 12 carbon atoms), or a copolymer having a structural unit based on the monomer.

Specific examples of the homopolymer and copolymer include polyacrylates such as polymethyl acrylate and polyethyl acrylate, polymethacrylates such as polymethyl methacrylate, polyethyl methacrylate, and polybutyl methacrylate, and copolymers such as an ethylene-acrylate copolymer, an ethylene-acrylate-acrylic acid copolymer, a styrene-methacrylate-acrylic acid copolymer, an acrylate-vinyl chloride copolymer, an acrylate-acrylic acid copolymer, a methacrylate-vinyl chloride copolymer, a styrene-methacrylate-butadiene copolymer, and a methacrylate-acrylonitrile copolymer. The acrylic adhesive may contain any one of these homopolymers and copolymers alone or in combination of two or more thereof.

The insulating paper for oil-immersed motors according to the present embodiment has a proportion of the total thickness of each acrylic adhesive in the total thickness of the polyester film, the heat resistant sheets laminated to both front and back surfaces of the polyester film, and each acrylic adhesive between the heat resistant sheets and the polyester film (hereinafter, also referred to as a "proportion of the thickness of the adhesive") of preferably 10% or more, more preferably 17 to 30%, further preferably 17 to 23%.

The insulating paper for oil-immersed motors according to the present embodiment has the advantage of having excellent tracking resistance, when the proportion of the thickness of the adhesive is 10% or more. Further, the insulating paper for oil-immersed motors according to the present embodiment has the advantage of easy processing by cutting, when the proportion of the thickness of the adhesive is 30% or less.

The thickness of the polyester film is preferably 25 to 250 μM, more preferably 50 to 125 μm.

The thickness of the polyester film means a value obtained by measuring the thickness of 5 to 10 points of the polyester film with a micrometer and determining the arithmetic average of these measured values.

The thickness of each of the heat resistant sheets is preferably 37 to 125 μm.

The thickness of the heat resistant sheets means a value obtained by measuring the thickness of 5 to 10 points of each of the heat resistant sheets with a micrometer and determining the arithmetic average of these measured values.

The thickness of each of the acrylic adhesive in the insulating paper for oil-immersed motors is preferably 15 to 30 μm.

The thickness of the acrylic adhesive in the insulating paper for oil-immersed motors means a value obtained by removing the polyester film and the heat resistant sheets from the insulating paper for oil-immersed motors, measuring the thickness of 5 to 10 points of the acrylic adhesive with a micrometer, and determining the arithmetic average of these measured values.

The combination of each sheet can be suitably selected according to the heat resistance required. Therefore, for example, when a heat resistance of 120° C. is required, the insulating paper can be prepared by using a low-oligomer type polyester film (for example, Lumirror X10S, manufactured by Toray Industries, Inc.) and laminating PEN films to both front and back surfaces of the polyester film as heat resistant sheets via the acrylic adhesive.

Further, for example, when a heat resistance of 150° C. is required, the insulating paper can be prepared by using a PEN film as a polyester film and laminating polyamide films to both front and back surfaces of the polyester film via the acrylic adhesive; or the insulating paper can be prepared by similarly using a PEN film as a polyester film and laminating polyimide (PI) films to both front and back surfaces of the polyester film via the acrylic adhesive.

Note that although the addition of terpene phenol and alkylphenol allows the acrylic adhesive to be flexible as described above, the addition of terpene phenol and alkylphenol not only soften the acrylic adhesive but increases the stickiness thereof. As a result, the acrylic adhesive may stick to or may be deposited on a place which contacts the end face of the insulating paper for oil-immersed motors, for example, a guide roll and the like of a processing machine when the insulating paper is subjected to folding or the like.

Therefore, when using a film such as a PEN film, a polyamide film, or a polyimide film, which is used at a temperature as described above, the possibility that the acrylic adhesive is brought into contact with air and water can be reduced, as compared with the case of using, for example, heat-resistant paper made from polyamide, where it is used at high temperatures; air and water are easily passed from the surface side to the acrylic adhesive side of the insulating paper for oil-immersed motors; and heat resistance and hydrolysis resistance are demanded in the acrylic adhesive itself. Therefore, when a film-like product is used as a heat resistant sheet, the sticking of the acrylic adhesive to a processing machine can be suppressed while improving the durability of the insulating paper for oil-immersed motors by using an excessive amount of polyisocyanate for crosslinking as compared with the amount generally used instead of using a method of adding terpene phenol and alkylphenol, in the same manner as in the case where heat-resistant paper sheets made from polyamide are laminated to both front and back surfaces of the polyester film via the acrylic adhesive in which terpene phenol or alkylphenol is added.

Moreover, the adhesive properties and adhesion of the acrylic adhesive can be improved in the same manner as in the case where terpene phenol or alkylphenol is added, by using an excessive amount of polyisocyanate in this way as compared with the amount generally used.

Note that, although insulating paper for oil-immersed motors having a five layer structure including an adhesive has been described in the present embodiment, the present invention is not limited to this embodiment, but the insulating paper can also have six or more layers by optionally laminating other films or adhesives to the inside or outside thereof.

The insulating paper for oil-immersed motors of the present invention can also have an asymmetric structure in which the type of resin or thickness is different in the front and back.

The insulating paper for oil-immersed motors of the present invention is used as an insulating material in an oil-immersed motor.

Examples of the insulating material in a motor stator which constitutes an oil-immersed motor include an insulating material inserted between a core material and a winding in order to insulate them and an insulating material inserted between windings having different phases in order to insulate them. Further, examples of the insulating material in a rotor which constitutes an oil-immersed motor include an insulating material inserted between a core material and a winding in the same manner as in the motor stator. Furthermore, in addition to the above, the insulating paper can be used as an insulating material for the neutral point which is a binding part of different phases.

When the insulating paper for oil-immersed motors having a structure as described above is used, it is possible to constitute an oil-immersed motor which prevents the insulating paper from easily deteriorating even if the constituent members thereof are immersed in oil in a high temperature state and exhibits stable performance even in a severe operating condition.

EXAMPLES

Hereinafter, the present invention will be described in more detail with reference to Examples, Comparative Examples, Reference Examples, and Reference Comparative Examples.

Reference Example 1

The insulating paper for oil-immersed motors of Reference Example 1 was prepared by laminating heat resistant sheets (each having a thickness of 16 μm, Teonex Q-51, manufactured by DuPont Teijin Ltd.) to both front and back surfaces of a low-oligomer PET film "Lumirror X-10S" (having a thickness of 188 μm, manufactured by Toray Industries, Inc.), which is a polyester film, via a mixture of polybutyl acrylate and terpene phenol crosslinked with isocyanate, which is an acrylic adhesive.

Reference Comparative Example 1

The insulating paper for oil-immersed motors of Reference Comparative Example 1 was prepared in the same manner as in Reference Example 1 except that a polyol crosslinked with isocyanate, which is a urethane adhesive, was used instead of the acrylic adhesive.

Reference Example 2

The insulating paper for oil-immersed motors of Reference Example 2 was prepared by laminating a heat resistant sheet "Nomex 464" (having a thickness of 16 μm, manufactured by DuPont Teijin Ltd.) to both front and back surfaces of "Teonex Q-51" (having a thickness of 16 μM, manufactured by DuPont Teijin Ltd.) as a polyester film via the same acrylic adhesive as in Reference Example 1.

Reference Comparative Example 2

The insulating paper for oil-immersed motors of Reference Comparative Example 2 was prepared in the same manner as in Reference Example 2 except that the same urethane adhesive as in Reference Comparative Example 1 was used instead of the acrylic adhesive.

The insulating paper for oil-immersed motors of the above Reference Examples and Reference Comparative Examples were used to measure "tensile strength" and "elongation" in accordance with the test method specified in JIS C 2111-8 and "dielectric breakdown voltage" in accordance with the test method specified in JIS C2111-27.1. The results are shown in FIGS. 2 to 8 and Tables 1 and 2.

TABLE 1

Retention of Elongation (Elapsed time [Hr] until retention is 50%)

| | | Test temperature (° C.) | | | |
|---|---|---|---|---|---|
| | Adhesive | 90 | 110 | 130 | 150 |
| Reference Example 1 | Acrylic | 3500 | 2000 | <250 | <24 |
| Reference Comparative Example 1 | Urethane | 2500 | 500 | | |
| Reference Example 2 | Acrylic | ≥6500 | 5000 | 500 | 24 |
| Reference Comparative Example 2 | Urethane | | 3000 | <500 | <24 |

TABLE 2

Retention of Tensile Strength (Elapsed time [Hr] until retention is 50%)

| | | Test temperature (° C.) | | | |
|---|---|---|---|---|---|
| | Adhesive | 90 | 110 | 130 | 150 |
| Reference Example 1 | Acrylic | ≥6500 | 5000 | 1000 | 400 |
| Reference Comparative Example 1 | Urethane | | 3000 | 400 | 200 |
| Reference Example 2 | Acrylic | | ≥6500 | 4500 | 1200 |
| Reference Comparative Example 2 | Urethane | | | 2700 | 750 |

As shown in FIGS. 2 to 8 and Tables 1 and 2, it is found that the insulating paper for oil-immersed motors of Reference Examples 1 and 2 are excellent in heat resistance compared with the insulating paper for oil-immersed motors of Reference Comparative Examples 1 and 2.

Reference Examples 3 to 18

The insulating paper for oil-immersed motors was prepared by laminating a heat resistant sheet (Teonex Q-51, having a thickness of 16 μm, manufactured by DuPont Teijin Ltd.) to both front and back surfaces of a low-oligomer PET film "Lumirror X-10S" (having a thickness of 188 μm, manufactured by Toray Industries, Inc.) which is a polyester film via an acrylic adhesive.

The formulation of the acrylic adhesives used here is as shown in Table 3.

TABLE 3

| | Reference Example 3 | Reference Example 4 | Reference Example 5 | Reference Example 6 | Reference Example 7 | Reference Example 8 | Reference Example 9 |
|---|---|---|---|---|---|---|---|
| Polybutyl acrylate | 100 | 100 | 100 | 100 | 100 | 100 | 100 |
| Polyisocyanate | 1 | 3 | 5 | 10 | 10 | 10 | 10 |
| Alkylphenol | 20 | 20 | 20 | 20 | 0 | 1 | 5 |
| | Reference Example 10 | Reference Example 11 | Reference Example 12 | Reference Example 13 | Reference Example 14 | Reference Example 15 | Reference Example 16 |
| Polybutyl acrylate | 100 | 100 | 100 | 100 | 100 | 100 | 100 |
| Polyisocyanate | 15 | 15 | 15 | 20 | 20 | 20 | 25 |
| Alkylphenol | 0 | 1 | 5 | 0 | 1 | 5 | 0 |
| | Reference Example 17 | Reference Example 18 | | | | | |
| Polybutyl acrylate | 100 | 100 | | | | | |
| Polyisocyanate | 25 | 25 | | | | | |
| Alkylphenol | 1 | 5 | | | | | |

* The numerical values in this table represent parts by weight.

(Evaluation of Fouling Characteristics)

The sticking of the adhesive to a processing machine (the fouling of a processing machine) by the contact of the end of the insulating paper for oil-immersed motors with the processing machine was evaluated.

Figure 9:
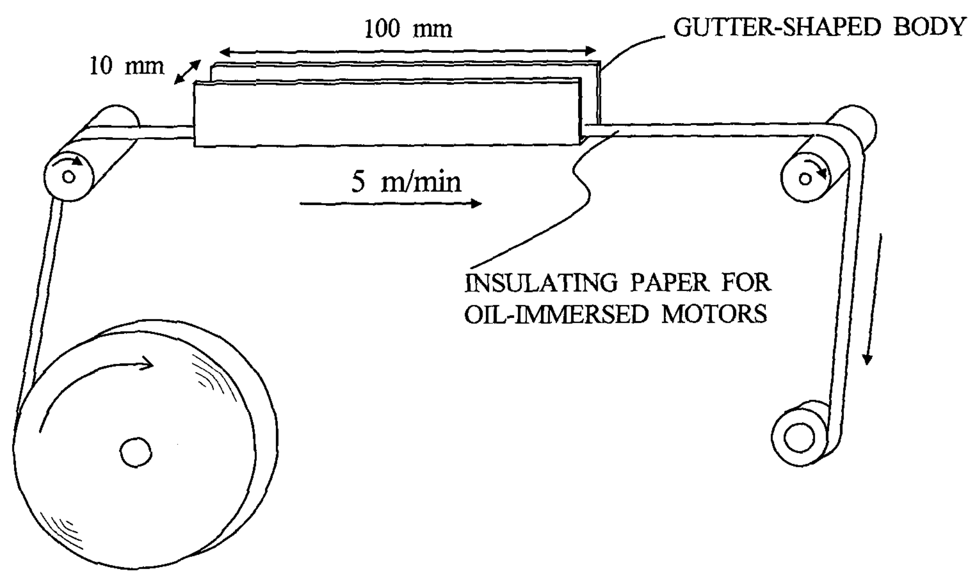
FIG. 9 is a schematic view showing the evaluation method of fouling characteristics.

In the evaluation of fouling characteristics, there were used a gutter-shaped body having an angular U-shaped cross section and a size of 10 cm in length and 10 mm in width which was prepared by folding a stainless sheet, and insulating paper for oil-immersed motors of any of Reference Examples 3 to 18 which was subjected to slitting into a reel of 10 mm in width×300 m in length, as shown in FIG. 9; and the insulating paper for oil-immersed motors drawn from the reel of the insulating paper for oil-immersed motors was slid on the bottom of the gutter-shaped body, and the winding reel was rotated so as to wind the insulating paper around the reel. The rotational speed of the winding reel at this time was adjusted so that the movement speed of the insulating paper for oil-immersed motors is to be 5 m/min. Further, this reel winding was repeated a plurality of times, and the side wall part of the gutter-shaped body was visually observed every time one reel winding is completed (1 hour) to check the presence or absence of the accumulation of a stuck substance.

The time until the accumulation of the stuck substance is visually recognized was evaluated as the fouling characteristics. The results are shown in Table 4.

(Evaluation of Processability)

The insulating paper for oil-immersed motors of Reference Examples 3 to 18 was folded in two, and the situation of the fold was observed visually. The results are shown in Table 4.

The fold which was neatly formed was defined as "○", and the case where lifting was observed at the folded part was defined as "x". Note that, in the part where the lifting was observed, a little peeling between the layers was observed.

TABLE 4

| | Reference Example 3 | Reference Example 4 | Reference Example 5 | Reference Example 6 | Reference Example 7 | Reference Example 8 | Reference Example 9 |
|---|---|---|---|---|---|---|---|
| Fouling characteristics (Hr) | 2 | 5 | 7 | 9 | 24 | 20 | 18 |
| Processability | ○ | ○ | ○ | ○ | ○ | ○ | ○ |
| | Reference Example 10 | Reference Example 11 | Reference Example 12 | Reference Example 13 | Reference Example 14 | Reference Example 15 | Reference Example 16 |
| Fouling characteristics (Hr) | 24 | 26 | 23 | 33 | 30 | 27 | 44 |
| Processability | ○ | ○ | ○ | ○ | ○ | ○ | x |
| | Reference Example 17 | Reference Example 18 | | | | | |
| Fouling characteristics (Hr) | 43 | 40 | | | | | |
| Processability | x | x | | | | | |

From Table 4, it is found that fouling characteristics are reduced when the amount of polyisocyanate added is set to more than 3 parts by weight and 25 parts by weight or less based on 100 parts by weight of polybutyl acrylate (PAB). Moreover, it is found that insulating paper excellent also in processability is obtained when the amount of polyisocyanate added is set to 10 parts by weight or more to 20 parts by weight or less based on 100 parts by weight of polybutyl acrylate (PAB).

(Heat Resistance, Hydrolysis Resistance)

When the insulating paper of Reference Examples 3 to 9 was evaluated for the retention of elongation, tensile strength, and dielectric breakdown voltage at a temperature of 90 to 150° C. in the same manner as in Reference Examples 1 and 2, the same result as in Reference Example 1 was obtained in all the insulating paper.

Examples 1 to 3, and Comparative Example 1

The insulating paper for oil-immersed motors of Examples 1 to 3 and Comparative Example 1 was prepared by laminating aramid paper (having a thickness of 50 μm, trade name "Nomex 464", manufactured by DuPont Teijin Ltd.) to both front and back surfaces of a polyethylene terephthalate film (having a thickness of 100 μm, trade name "Lumirror S-10", manufactured by Toray Industries, Inc.) via an acrylic adhesive and cutting the laminate into a 50 mm square.

The acrylic adhesive used here comprises polybutyl acrylate, alkylphenol, and polyisocyanate, wherein the alkylphenol and the polyisocyanate are contained in a proportion of 5 parts by weight and 10 parts by weight, respectively, based on 100 parts by weight of the polybutyl acrylate.

Further, a polybutyl acrylate as shown in Table 5 was used. Note that Mmin, Mmax, Mw, and Mn show the minimum molecular weight, the maximum molecular weight, the weight average molecular weight, and the number average molecular weight, respectively. The minimum molecular weight, the maximum molecular weight, the weight average molecular weight, and the number average molecular weight were measured by gel permeation chromatography (GPC) and expressed in terms of polystyrene.

TABLE 5

Molecular weight of polybutyl acrylate

| | Molecular weight | | | | |
|---|---|---|---|---|---|
| | Mmin | Mmax | Mw | Mn | Mw/Mn |
| Comparative Example 1 | 800 | 3300000 | 238100 | 26100 | 9.12 |
| Example 1 | 700 | 8000000 | 443800 | 55400 | 8.01 |
| Example 2 | 83000 | 1100000 | 455000 | 18600 | 2.45 |
| Example 3 | 503000 | 3890000 | 1298000 | 456300 | 2.84 |

(Evaluation)

(Protrusion Test)

Ten sheets of the insulating paper for oil-immersed motors of each of Examples 1 to 3 and Comparative Example 1 were stuck in the vertical direction on a stand; the stack was pressurized for 1 minute at a given pressure (20 MPa, 100 MPa, 200 MPa, and 300 MPa) with a larger board than the insulating paper for oil-immersed motors from the top of the insulating paper for oil-immersed motors; and the amount of the adhesive protruded from between the polyethylene terephthalate film and the aramid paper (the outflow of the adhesive) was measured.

Note that the outflow of the adhesive was determined by scraping off the protruded adhesive with a cutter and weighing the adhesive which was scraped off with the cutter.

Figure 10:
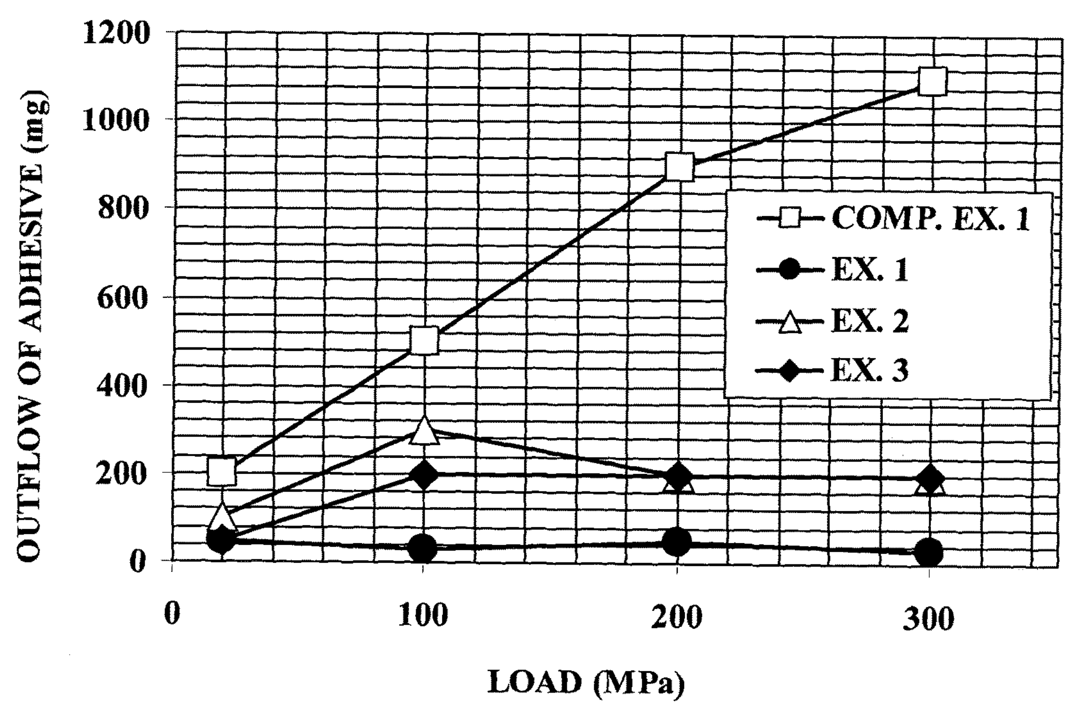
FIG. 10 is a graph showing the amount of an adhesive protruded from between a polyethylene terephthalate film and aramid paper when a stack of 10 sheets of the insulating paper for oil-immersed motors (50 mm square) of each Example and Comparative Example was pressurized for 1 minute at a given pressure (20 MPa, 100 MPa, 200 MPa, and 300 MPa).

The results are shown in FIG. 10.

As shown in FIG. 10, the insulating paper for oil-immersed motors of Examples 1 to 3 within the scope of the present invention provides a result in which the amount of adhesive protruded is smaller than that of Comparative Example 1 comprising a polybutyl acrylate having an Mw of 238100, and it is found that the present invention can suppress the occurrence of trouble caused by the protruded adhesive.

Further, the insulating paper for oil-immersed motors of Example 1 provides a result in which the amount of adhesive protruded is smaller than that of Example 2 comprising a polybutyl acrylate having an Mw/Mn of 2.45 and Example 3 comprising a polybutyl acrylate having an Mw/Mn of 2.84, and it is found that the Mw/Mn of polybutyl acrylate is preferably 5 or more.

(Additional Example 1)

The insulating paper for oil-immersed motors was prepared by laminating aramid paper (having a thickness of 2.0 mils (50.8 μm), trade name "Nomex 464", manufactured by DuPont Teijin Ltd.) to both front and back surfaces of a polyethylene terephthalate film (having a thickness of 125 μm, trade name "Q-51", manufactured by DuPont Teijin Ltd.) via an acrylic adhesive.

Here, the insulating paper for oil-immersed motors was prepared so that the thickness of each acrylic adhesive is to be 5 μm.

Therefore, the proportion of the thickness of the adhesive in the insulating paper for oil-immersed motors is 4.2%.

Additional Example 2

The insulating paper for oil-immersed motors was prepared by laminating aramid paper (having a thickness of 2.0 mils (50.8 μm), trade name "Nomex 464", manufactured by DuPont Teijin Ltd.) to both front and back surfaces of a polyethylene terephthalate film (having a thickness of 125 μm, trade name "Q-51", manufactured by DuPont Teijin Ltd.) via an acrylic adhesive.

Here, the insulating paper for oil-immersed motors was prepared so that the thickness of each acrylic adhesive is to be 10 μm.

Therefore, the proportion of the thickness of the adhesive in the insulating paper for oil-immersed motors is 8.1%.

Additional Example 3

The insulating paper for oil-immersed motors was prepared by laminating aramid paper (having a thickness of 2.0 mils (50.8 μm), trade name "Nomex 464", manufactured by DuPont Teijin Ltd.) to both front and back surfaces of a polyethylene terephthalate film (having a thickness of 125 μm, trade name "Q-51", manufactured by DuPont Teijin Ltd.) via an acrylic adhesive.

Here, the insulating paper for oil-immersed motors was prepared so that the thickness of each acrylic adhesive is to be 15 μm.

Therefore, the proportion of the thickness of the adhesive in the insulating paper for oil-immersed motors is 11.7%.

Additional Example 4

The insulating paper for oil-immersed motors was prepared by laminating aramid paper (having a thickness of 1.5 mils (38.1 μm), trade name "Nomex 464", manufactured by DuPont Teijin Ltd.) to both front and back surfaces of a polyethylene terephthalate film (having a thickness of 50 μm, trade name "Q-51", manufactured by DuPont Teijin Ltd.) via an acrylic adhesive.

Here, the insulating paper for oil-immersed motors was prepared so that the thickness of each acrylic adhesive is to be 10 μm.

Therefore, the proportion of the thickness of the adhesive in the insulating paper for oil-immersed motors is 13.7%.

Additional Example 5

The insulating paper for oil-immersed motors was prepared by laminating aramid paper (having a thickness of 1.5 mils (38.1 μm), trade name "Nomex 464", manufactured by DuPont Teijin Ltd.) to both front and back surfaces of a polyethylene terephthalate film (having a thickness of 50 μm, trade name "Q-51", manufactured by DuPont Teijin Ltd.) via an acrylic adhesive.

Here, the insulating paper for oil-immersed motors was prepared so that the thickness of each acrylic adhesive is to be 15 μm.

Therefore, the proportion of the thickness of the adhesive in the insulating paper for oil-immersed motors is 19.2%.

Additional Example 6

The insulating paper for oil-immersed motors was prepared by laminating aramid paper (having a thickness of 2.0 mils (50.8 μm), trade name "Nomex 464", manufactured by DuPont Teijin Ltd.) to both front and back surfaces of a polyethylene terephthalate film (having a thickness of 125 μm, trade name "Q-51", manufactured by DuPont Teijin Ltd.) via an acrylic adhesive.

Here, the insulating paper for oil-immersed motors was prepared so that the thickness of each acrylic adhesive is to be 30 μm.

Therefore, the proportion of the thickness of the adhesive in the insulating paper for oil-immersed motors is 20.9%.

(Evaluation)

(Evaluation of Tracking Resistance (Tracking Test))

The CTI (Comparative Tracking Index) value in the insulating paper for oil-immersed motors was measured in accordance with JIS C2134: 2007.

Figure 11:
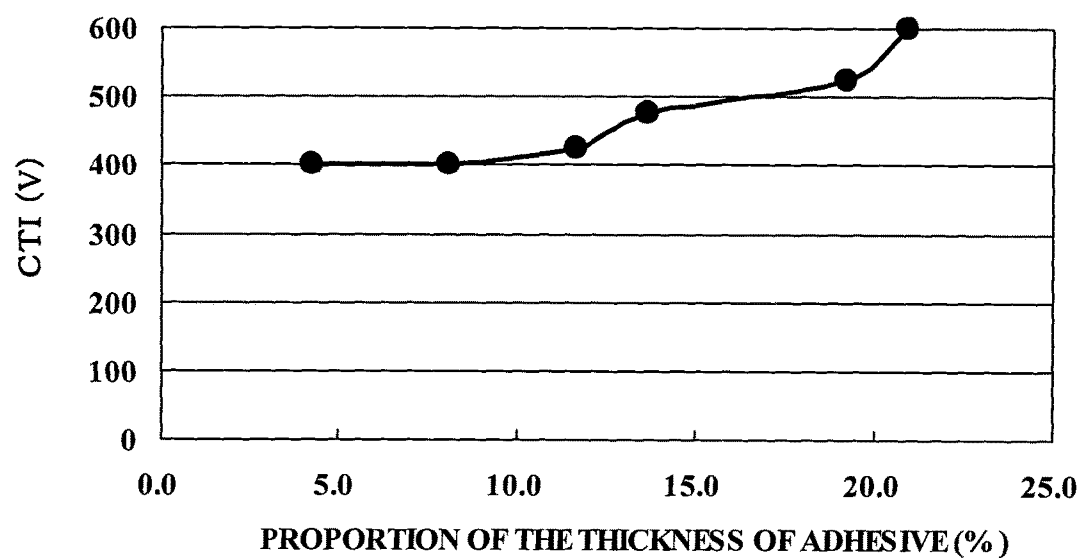
FIG. 11 is a graph showing the CTI value relative to the proportion of the thickness of the adhesive.

The results are shown in FIG. 11.

As shown also in FIG. 11, Additional Examples 3 to 6 in which the proportion of the thickness of the adhesive is 10% or more showed larger CTI values than those of Additional Examples 1 and 2 in which the proportion of the thickness of the adhesive is 8.1% or less. Therefore, it is found that insulating paper excellent in tracking resistance can obtained by setting the proportion of the thickness of the adhesive to 10% or more.

REFERENCE SIGNS LIST

1: Insulating Paper for Oil-immersed Motors, 2: Polyester Film, 3: Acrylic Adhesive, 4: Heat Resistant Sheet

The invention claimed is:

1. Insulating paper for oil-immersed motors used in an oil-immersed motor in a state where folding is applied to the paper, the motor operating in a state where it is immersed in a cooling oil, the paper comprising a polyester film and heat resistant sheets made from aromatic polyamide laminated to both front and back surfaces of the polyester film, the polyester film and the heat resistant sheets being bonded with an acrylic adhesive, wherein the acrylic adhesive contains polyisocyanate and a polybutyl acrylate having a weight average molecular weight of 400,000 or more, wherein the polyisocyanate is contained in a proportion of more than 3 parts by weight and 20 parts by weight or less based on 100 parts by weight of the polybutyl acrylate, and wherein the polybutyl acrylate has an Mw/Mn of 8.01 to 10, wherein Mw represents the weight average molecular weight, and Mn represents the number average molecular weight of the polybutyl acrylate.

2. The insulating paper for oil-immersed motors according to claim 1, wherein the polybutyl acrylate has a weight average molecular weight within a range from 400,000 to 1,000,000.

3. The insulating paper for oil-immersed motors according to claim 1, wherein the proportion of the polyisocyanate based on 100 parts by weight of the polybutyl acrylate is 10 parts by weight or more and 20 parts by weight or less.

4. The insulating paper for oil-immersed motors according to claim 1, wherein the proportion of the total thickness of each acrylic adhesive in the total thickness of the polyester film, the heat resistant sheets laminated to both front and back surfaces of the polyester film, and each acrylic adhesive between the heat resistant sheets and the polyester film is 10% or more.

5. The insulating paper for oil-immersed motors according to claim 3, wherein the proportion of the total thickness of each acrylic adhesive in the total thickness of the polyester film, the heat resistant sheets laminated to both front and back surfaces of the polyester film, and each acrylic adhesive between the heat resistant sheets and the polyester film is 10% or more.

6. The insulating paper for oil-immersed motors according to claim 1, wherein terpene phenol is further contained in the acrylic adhesive, wherein the terpene phenol is contained in the acrylic adhesive in an amount of 1 to 30 parts by weight based on 100 parts by weight of the polybutyl acrylate.

7. The insulating paper for oil-immersed motors according to claim 3, wherein terpene phenol is further contained in the acrylic adhesive, wherein the terpene phenol is contained in the acrylic adhesive in an amount of 1 to 30 parts by weight based on 100 parts by weight of the polybutyl acrylate.

8. The insulating paper for oil-immersed motors according to claim 4, wherein terpene phenol is further contained in the acrylic adhesive, wherein the terpene phenol is contained in the acrylic adhesive in an amount of 1 to 30 parts by weight based on 100 parts by weight of the polybutyl acrylate.

9. The insulating paper for oil-immersed motors according to claim 5, wherein terpene phenol is further contained in the acrylic adhesive, wherein the terpene phenol is contained in the acrylic adhesive in an amount of 1 to 30 parts by weight based on 100 parts by weight of the polybutyl acrylate.

10. The insulating paper for oil-immersed motors according to claim 1, wherein alkylphenol is further contained in the acrylic adhesive, wherein the alkylphenol is contained in the acrylic adhesive in an amount of 1 to 30 parts by weight based on 100 parts by weight of the polybutyl acrylate.

11. The insulating paper for oil-immersed motors according to claim 3, wherein alkylphenol is further contained in the acrylic adhesive, wherein the alkylphenol is contained in the acrylic adhesive in an amount of 1 to 30 parts by weight based on 100 parts by weight of the polybutyl acrylate.

12. The insulating paper for oil-immersed motors according to claim 4, wherein alkylphenol is further contained in the acrylic adhesive, wherein the alkylphenol is contained in the acrylic adhesive in an amount of 1 to 30 parts by weight based on 100 parts by weight of the polybutyl acrylate.

13. The insulating paper for oil-immersed motors according to claim 5, wherein alkylphenol is further contained in the acrylic adhesive, wherein the alkylphenol is contained in the acrylic adhesive in an amount of 1 to 30 parts by weight based on 100 parts by weight of the polybutyl acrylate.

14. The insulating paper for oil-immersed motors according to claim 2, wherein the proportion of the polyisocyanate based on 100 parts by weight of the polybutyl acrylate is 10 parts by weight or more and 20 parts by weight or less.

15. The insulating paper for oil-immersed motors according to claim 2, wherein the proportion of the total thickness of each acrylic adhesive in the total thickness of the polyester film, the heat resistant sheets laminated to both front and back surfaces of the polyester film, and each acrylic adhesive between the heat resistant sheets and the polyester film is 10% or more.

16. The insulating paper for oil-immersed motors according to claim 2, wherein terpene phenol is further contained in the acrylic adhesive, wherein the terpene phenol is contained in the acrylic adhesive in an amount of 1 to 30 parts by weight based on 100 parts by weight of the polybutyl acrylate.

17. The insulating paper for oil-immersed motors according to claim 2, wherein alkylphenol is further contained in the acrylic adhesive, wherein the alkylphenol is contained in the acrylic adhesive in an amount of 1 to 30 parts by weight based on 100 parts by weight of the polybutyl acrylate.

* * * * *